United States Patent [19]

Galloway

[11] 4,331,632
[45] May 25, 1982

[54] CATALYTIC CARTRIDGE SO₃ DECOMPOSER

[75] Inventor: Terry R. Galloway, Berkeley, Calif.

[73] Assignee: The United States of America as represented by the United States Department of Energy, Washington, D.C.

[21] Appl. No.: 208,218

[22] Filed: Nov. 18, 1980

[51] Int. Cl.³ .............................................. F28D 21/00
[52] U.S. Cl. ................... 422/206; 422/211; 422/312; 423/533; 423/536; 423/538; 423/539; 376/148
[58] Field of Search ...................... 422/206, 211, 312; 165/485; 423/533, 539, 539 A, 536, 538; 176/37, 87

[56] References Cited

U.S. PATENT DOCUMENTS

| | | | |
|---|---|---|---|
| 2,281,762 | 5/1942 | Grace | 423/539 A X |
| 2,648,599 | 8/1953 | Throckmorton et al. | 422/206 X |
| 2,910,350 | 10/1959 | Jean | 422/206 X |
| 3,206,334 | 9/1965 | Ehrenfeld | 422/211 X |
| 3,271,326 | 9/1966 | Forney et al. | 422/211 X |
| 3,562,346 | 2/1971 | Smirnov et al. | 422/211 X |
| 3,607,131 | 9/1971 | Williams et al. | 422/206 X |
| 3,656,913 | 4/1972 | Blaha et al. | 422/312 |
| 4,244,937 | 1/1981 | Durkin | 423/533 X |

FOREIGN PATENT DOCUMENTS 1152745  2/1958  France ................................ 422/206

OTHER PUBLICATIONS

Lee et al.; "Concept for a Gas Buffered Annular Heat Pipe Fuel Irradiation Capsule"; Lawrence Radiation Laboratory UCRL-50510; Jul. 25, 1968.
Werner, R. W.; "The Generation and Recovery of Tritium in Thermonuclear Reactor Blankets Using Heat Pipes"; Lawrence Radiation Laboratory UCID-15390; Oct. 3, 1968.
Galloway, T. R.; "Interfacing the Tandem Mirror Reactor to the Sulfur-Iodine Process for Hydrogen Production"; Lawrence Livermore Laboratory UCRL-84212; Jun. 2, 1980.
Galloway, T. R.; "Some Process Aspects of Hydrogen Production Using the Tandem Mirror Reactor"; Lawrence Livermore Laboratory UCRL-84285; Oct. 8, 1980.

Primary Examiner—Richard L. Chiesa
Attorney, Agent, or Firm—Marvin J. Marnock; Roger S. Gaither; Richard G. Besha

[57] ABSTRACT

A catalytic cartridge surrounding a heat pipe driven by a heat source is utilized as a SO₃ decomposer for thermochemical hydrogen production. The cartridge has two embodiments, a cross-flow cartridge and an axial flow cartridge. In the cross-flow cartridge, SO₃ gas is flowed through a chamber and incident normally to a catalyst coated tube extending through the chamber, the catalyst coated tube surrounding the heat pipe. In the axial-flow cartridge, SO₃ gas is flowed through the annular space between concentric inner and outer cylindrical walls, the inner cylindrical wall being coated by a catalyst and surrounding the heat pipe. The modular cartridge decomposer provides high thermal efficiency, high conversion efficiency, and increased safety.

7 Claims, 3 Drawing Figures

CATALYTIC CARTRIDGE SO₃ DECOMPOSER

BACKGROUND OF THE INVENTION

The invention relates to thermochemical cycles for hydrogen production and more particularly to sulfur trioxide (SO₃) decomposition reactors utilized in thermochemical cycles for hydrogen production. The United States Government has rights in this invention pursuant to Contract No. W-7405-ENG-48 between the U.S. Department of Energy and the University of California.

Hydrogen, a valuable raw material for the petroleum and petrochemical industries, is expected to become by early in the next century an important renewable-based, transportable fuel either by itself or in some hydrocarbon form such as methanol. Hydrogen can be produced through the decomposition of water by means of thermochemical cycles which reduce the high temperature requirements of the 3000° K. (degrees Kelvin) straight thermal decomposition process to the 1200° K. levels that can be generated in nuclear fission or fusion reactors or in high intensity, focused solar reflectors.

An example of a thermochemical process for producing hydrogen is the sulfur-iodine cycle being developed by the General Atomic Company. The essential steps of the sulfur iodine cycle are represented by the following reactions:

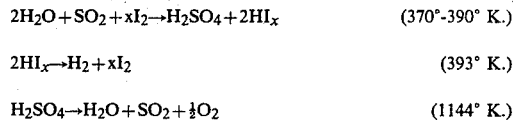

The dominant energy requirements, heat versus temperature, are necessary in this process for the H₂SO₄ concentration and vaporization, conversion of H₂SO₄ into SO₃+H₂O, and SO₃ decomposition steps.

The SO₃ decomposer is the critical process unit in nearly all the viable thermochemical plants to produce hydrogen. These plants can be driven by high temperature gas reactors, solar collectors or fusion reactors, utilizing sodium, potassium or helium as heat transfer fluids to supply the large heat demand of the SO₃ decomposer. Catalysts are required in the decomposer in order to keep the temperature required to reasonable levels of 1070°–1120° K. The key requirement is to supply heat to the catalytic surfaces where the endothermic SO₃ reaction occurs. This SO₃ decomposition produces SO₂ and O₂ for the thermochemical production of hydrogen.

Measured SO₃ kinetics and equilibrium show this high temperature SO₃ decomposition reactor to be surface kinetics (heterogeneous) controlled at lower temperatures, below 1050° K., and homogeneous at higher temperatures, above 1180° K. For non-catalytic surfaces the conversion from SO₃ to SO₂ is about 20–30% over the temperature range 1080° K. to 1180° K. for a 0.3 to 1 second residence time at around 1.5 atm. total pressure. The low conversion leads to large recycle H₂SO₄ flows and thus much larger and more expensive equipment. Increased residence time improves the kinetics but increases the size of the equipment. Increased total pressure decreases the equipment size but unfavorably shifts the equilibrium, and decreased conversion increases equipment size. Catalytically enhanced kinetics greatly improve the conversion to the range of 65–80%. It is desirable to operate at a temperature of around 1050° K. in order to eliminate the need of very expensive platinum catalysts and allow substitution of much less expensive CuO or Fe₂O₃ catalysts.

The design of a chemical reactor with fast kinetics and large associated heat effects is very difficult. A design of least cost and greatest simplicity is desired. Catalytic decomposers heated by internal heat exchangers appear to be too large to be cost competitive with other hydrogen production technologies. The most obvious choice, a packed bed reactor, does not appear feasible because heat transfer from in-bed heat exchangers to the packed bed of catalysts is very inefficient and requires extremely large temperature gradients between the heat exchanger fluid and the packed bed. Costly, high heat transfer media flow rates are also required, and large radial temperature gradients appear within the bed between the internal heat exchanger tube elements. Fluidization of the bed of catalysts greatly reduces the temperature differences between the heat transfer fluid and the catalyst surface. However, substantial pumping power is required to fluidize the bed, resulting in a higher operational cost design.

Fusion reactors offer some unique advantages as drivers for thermochemical hydrogen plants. Thermal heat from the blanket of a tandem mirror fusion reactor can be utilized. One particular tandem mirror blanket concept is a lithium-sodium, liquid metal 50% weight mixture in the cauldron blanket module. Helium or sodium can be used as the heat transfer fluid to carry heat outside the nuclear island to process exchangers within the thermochemical hydrogen production cycle. Either a direct condensing vapor heat exchange loop or a heat pipe driven loop can be utilized. Problems with this design, however, include the safety problems of the isolation of liquid metals from the process stream and the permeation of radioactive tritium into the product stream.

Thermochemical cycles, the interface with thermal reactors, fluidized bed decomposer designs, and associated problems, are described in UCRL-84212, "Interfacing the Tandem Mirror Reactor to the Sulfur Iodine Process for Hydrogen Production", T. R. Galloway, Lawrence Livermore National Laboratory, June 1980, and UCRL-84285, "The Process Aspects of Hydrogen Production Using the Tandem Mirror Reactor", T. R. Galloway, Lawrence Livermore National Laboratory, September 1980, which are herein incorporated by reference.

It is accordingly an object of the invention to provide a low cost and high efficiency SO₃ decomposer for a thermochemical hydrogen production process.

It is also an object of the invention to provide a catalytic SO₃ decomposer which can be interfaced with a tandem mirror fusion reactor at 1200° K. or below.

It is another object of the invention to provide a SO₃ decomposer with improved safety barriers and added modularity for increased reliability.

It is also an object of the invention to provide a SO₃ decomposer which can interface with a fusion reactor which has improved tritium processing and isolation features.

It is another object of the invention to provide a SO₃ decomposer which operates at a temperature to allow the use of inexpensive CuO or Fe₂O₃ catalysts in place of more expensive platinum catalysts.

It is yet another object of the invention to provide a SO₃ decomposer which provides a high efficiency transfer of heat from the source to the catalyst.

It is still another object of the invention to provide a SO₃ decomposer which has a high conversion efficiency.

SUMMARY OF THE INVENTION

The invention is an improved SO₃ decomposer for thermochemical hydrogen production comprising a cartridge having a surface coated with a catalyst. The catalytic cartridge surrounds a heat pipe driven by a heat source to heat the catalyst, and SO₃ gas is flowed through the cartridge to contact the catalyst to produce the SO₃ decomposition reactions. There are two preferred embodiments of the invention, a cross-flow cartridge and an axial-flow cartridge. In the cross-flow catalytic cartridge, the process gases flow through a chamber and are incident normal to a catalyst coated tube extending through the chamber. In the axial-flow catalytic cartridge, the process gases flow parallel to a catalyst coated tube in an annular space surrounding the catalyst coated tube. The catalyst coated tube of either decomposer design surrounds the heat pipe, and is either in thermal contact with the heat pipe or separated by a narrow gap. The heat pipe transports heat from the heat source to the catalytic cartridge decomposer to heat the catalyst surface over which the SO₃ gas flows to produce SO₃ decomposition into SO₂+O₂. When a fusion reactor is utilized as the heat source, a tritium-concentrating heat pipe plus counter-current helium purge in a narrow gap between the heat pipe and the catalyst coated tube are utilized to remove radioactive tritium.

The catalytic cartridge surrounding a heat pipe eliminates many of the disadvantages of the prior art. No dangerous sodium or potassium heat transfer fluids are needed. No large temperature differences exist between the heat source and the catalyst surface. No large heat transfer fluid flow rates are required. No high pressure helium gas is necessary. The design provides a very safe system which eliminates the danger of escape of radioactive tritium.

The foregoing and other aspects of the invention will become apparent from the following detailed description in conjunction with the accompanying drawings.

DETAILED DESCRIPTION

Figure 1:
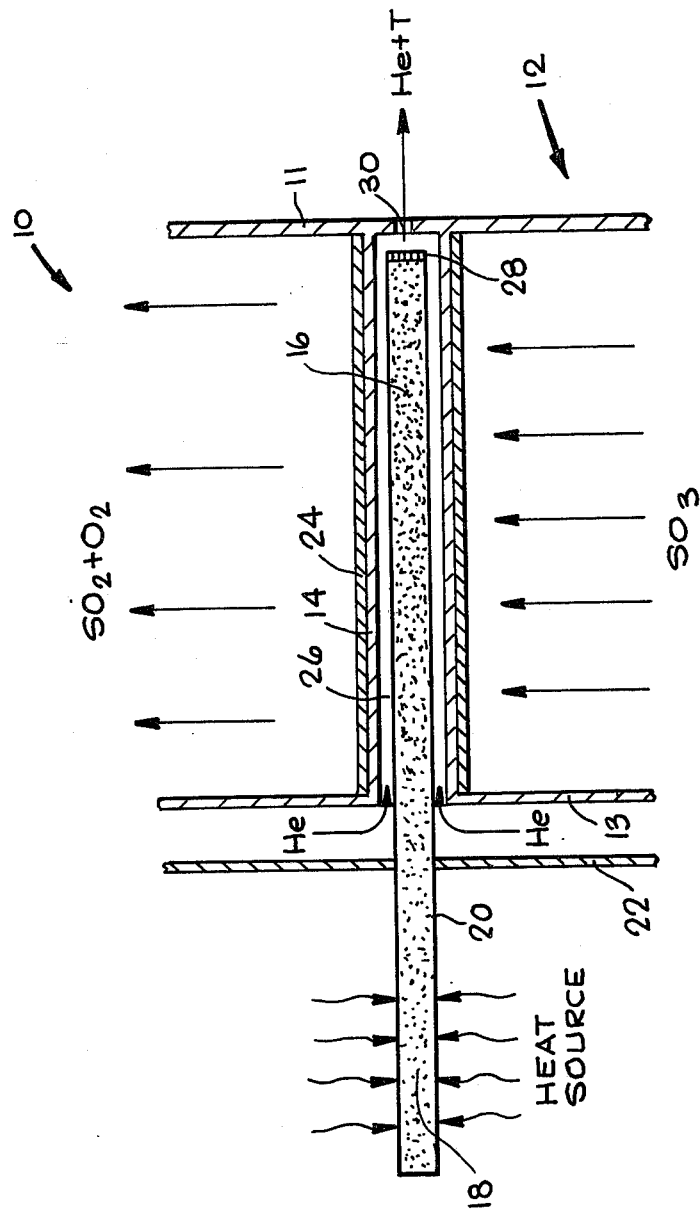
FIG. 1 is a sectional schematic view of the cross-flow catalytic cartridge decomposer.
Figure 2:
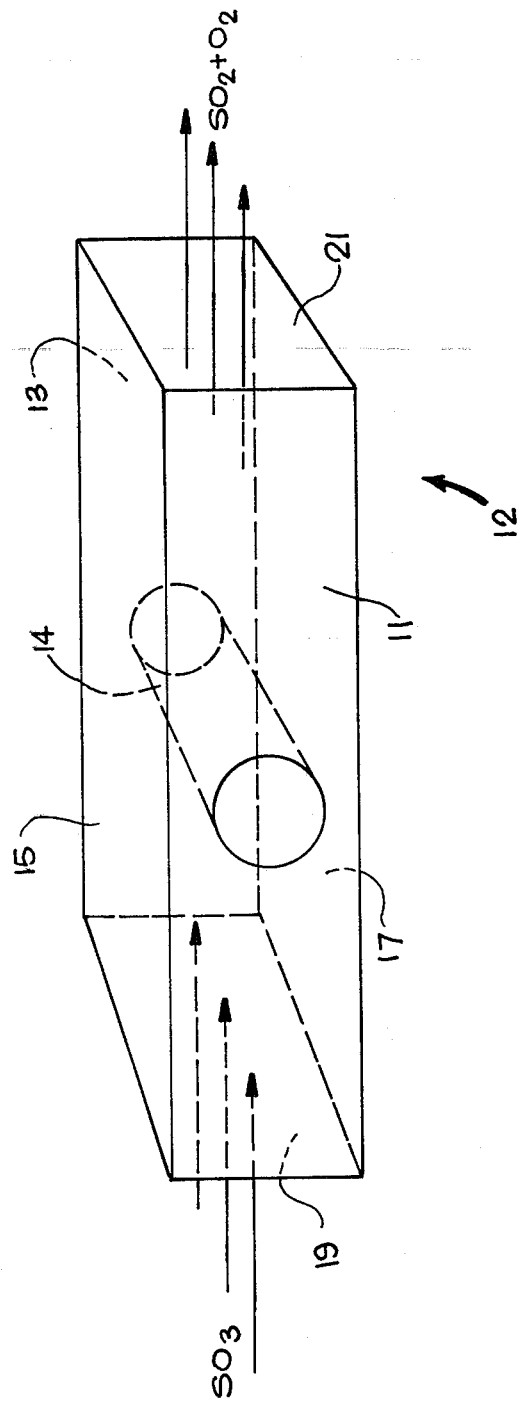
FIG. 2 is a perspective schematic view of the cross-flow catalytic cartridge decomposer.

The cross-flow catalytic cartridge SO₃ decomposer 10, shown in FIGS. 1 and 2, comprises a hermetically sealed process module or chamber 12 having lateral sides 11 and 13, top side 15, and bottom side 17. A metal alloy tube 14 extending through chamber 12 from lateral side 11 to lateral side 13 surrounds the condenser region 16 of a heat pipe 20. The evaporator region 18 of heat pipe 20 is exposed to a heat source such as a fusion reactor or solar collector. The heat pipe transports heat from the heat source through the isolating wall 22 to the catalytic cartridge 10. The tube 14 extending through the chamber 12 is in thermal contact with the condenser region 16 of heat pipe 20 or is separated from the condenser region 16 by a narrow gap 26. A layer 24 of catalyst is coated on the tube 14 and is heated by heat transfer from the heat pipe 20, being kept at a temperature of about 1070° K. SO₃ gas is flowed in through inlet port 19 at one end of chamber 12 and flowed through the chamber 12 incident to the tube 14 across the heated catalyst layer 24, thereby producing the decomposition reaction of SO₃. The decomposition products SO₂+O₂ are removed through outlet port 21 at the opposite end of chamber 12 and are utilized in the thermochemical hydrogen production cycle. The flow of the SO₃ gas is a cross-flow through the chamber 12 through which the tube 14 extends normal to the gas flow.

When the heat source is a fusion reactor with the attendant problem of radioactive tritium permeation, the heat pipe 20 is a tritium-concentrating heat pipe having a tritium permeable window 28, such as a niobium window, at the end of the condenser region 16 farthest from the evaporator region 18. With the fusion reactor heat source, a decomposer design having a gap 26 between the catalytic cartridge tube 14 and the heat pipe 20 is preferable. Helium gas is flowed through the gap 26 to sweep out any tritium which permeates radially out of the heat pipe 20 or through window 28. The flowing helium sweep gas removes all of the permeated tritium through aperture 30 provided in the chamber wall 11.

The cross-flow catalytic cartridge 10 provides a simple design having the lowest capital cost and high performance. The design provides a chamber 12 which is a single modular unit hermetically sealed from the heat pipe 20 and flowing helium gas, for high reliability and safety. The catalyst, for ease of deposition, can cover all of the chamber 12 instead of just the tube 14, particularly when low cost catalysts are used. The design provides significant heat transfer advantages as well. The most efficient heat transfer is obtained when tube 14 makes thermal contact with heat pipe 20. When gap 26 is included, an additional temperature drop between the heat pipe 20 and catalyst layer 24 is introduced. The cross flow around the catalyst coated tube 14 is more effective due to turbulence provided by the wake of the gas flow around the tube which enhances the heat transfer.

Figure 3:
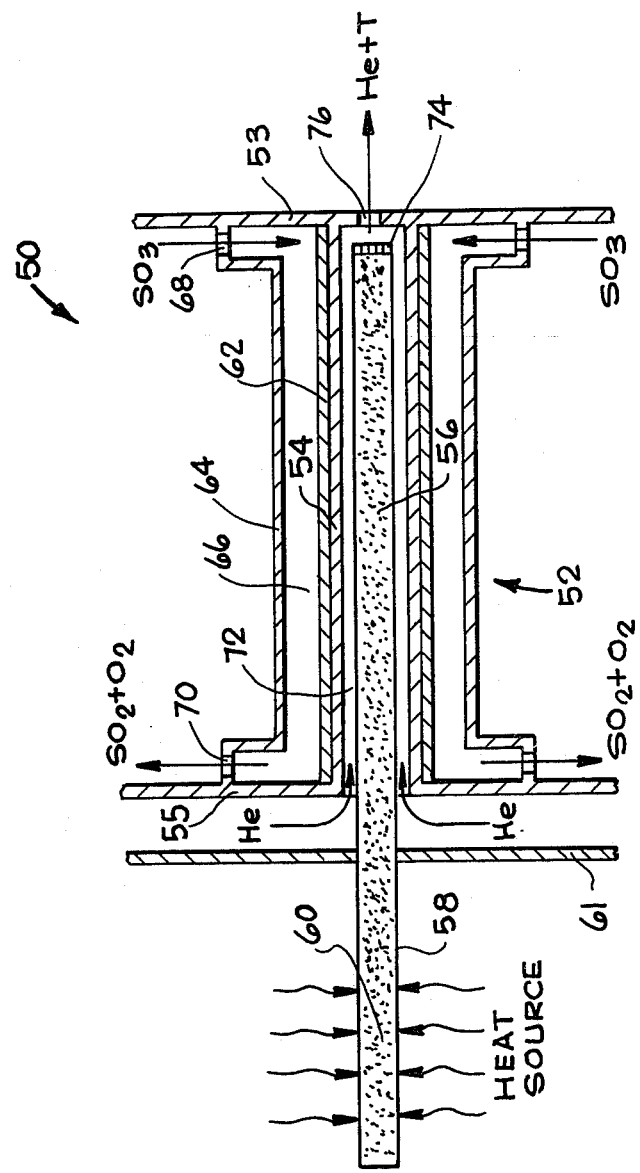
FIG. 3 is a sectional schematic view of the axial-flow catalytic cartridge decomposer.

The axial-flow catalytic cartridge decomposer 50, show in FIG. 3, comprises a cylindrical cartridge 52 having an inner cylindrical wall 54 and a concentric outer wall 64, defining an annular space 66 therebetween, and joined at end walls 53 and 55. The inner wall 54 surrounds the condenser region 56 of heat pipe 58. The surface of the cylindrical wall 54 at the annular space 66 is coated with a layer 62 of catalyst. The evaporator section 60 of heat pipe 58 is exposed to a heat source such as a fusion reactor, nuclear reactor or solar collector. The heat pipe 58 transports heat from the heat source through the isolating wall 61 to the catalytic cartridge 52. The cylindrical wall 54 is in thermal contact with the condenser region 56 of heat pipe 58 or is separated from the heat pipe by a narrow gap 72. The heat pipe keeps the catalytic layer 62 at a temperature of about 1070° K. Process SO₃ gas if flowed into the annular space 66 through inlet 68 located at one end of outer wall 64 and flows axially through the cartridge over the catalytic surface 62 thereby producing decomposition reactions into SO₂ plus O₂ which are removed from the cartridge 52 through outlet 70 at the opposite end of outer wall 64. The surface of the outer wall 64 of the annular space can also be coated with catalyst as well as the inner wall 54. The SO$_3$ gas flow is preferably from the end of the heat pipe condenser region 56 toward the evaporator region 60 so that the counter-flowing gas leaves at the hottest conditions, thereby resulting in the highest conversion.

When the heat source is a fusion reactor which contains radioactive tritium, the heat pipe 58 is a tritium concentrating heat pipe having a tritium permeable window 74 such as a niobium window at the end of the condenser region 56. When the heat source contains radioactive tritium, the cartridge design having a narrow gap 72 between the wall 54 and heat pipe 58 is utilized and helium gas is flowed through the pipe to sweep out permeated tritium through aperture 76 in end wall 53. Heat pipe technology and the tritium concentrating heat pipe are described in UCRL-50510, "Concept for a Gas-Buffered Annular Heat Pipe Fuel Irradiation Capsule", J. D. Lee and R. W. Werner, Lawrence Livermore National Laboratory, 1968, and UCID-15390, "The Generation and Recovery of Tritium in Thermonuclear Reactor Blankets", R. W. Werner, Lawrence Livermore National Laboratory, 1968, which are herein incorporated by reference.

In both cartridge designs, the closeness of the catalytic surface to the heat pipe results in a highly efficient heat transfer to the catalyst with a small temperature gradient. The catalytic surface is kept at a temperature of about 1070° K. by the heat pipe to produce the SO$_3$ decomposition reactions with a high conversion efficiency. The catalyst is a heavy metal oxide such as CuO or Fe$_2$O$_3$ or a precious metal such as platinum, coated onto alumina, zeolite, silica, or other substrates. The substrates, which are mostly ceramic, can be deposited on the metal surface but high quality thermal contact is not required. The catalytic cartridge is preferably made of a metal alloy such as aluminized Incoloy 800H in order to resist the corrosive SO$_2$. The catalyst coating on the surface is about 250 microns thick. Since the reaction depth is 250 microns, the catalyst layer is therefore fully active. The heat pipe is typically 1 cm in diameter and has a condensing region 2 meters in length. The heat pipe may be made of Incoloy 800H with a wall thickness of ½ mm to 1 mm. The heat pipe would operate at around 1120° K. when the catalyst coated wall is in thermal contact with the heat pipe. The annular gap for helium gas flow is ½ mm and introduces a temperature drop of about 70° K. which might be reduced by using a grooved passageway for the helium gas instead of an annular gap. The helium gas sweep can be at low pressure and rate, under 0.1 m/s and 0.01 atm. With the added temperature drop across the gap, the heat pipe would operate at around 1190° K. The SO$_3$ process stream enters the catalytic cartridge at 1050° K. so the decomposer need not supply the sensible heat to raise the SO$_3$ from 800° K. to 1050° K. A preheater with a similar configuration to the catalytic cartridge but without any catalytic surfaces could be utilized to preheat the SO$_3$. A combined unit could be utilized in which the heat pipe temperature would be higher in order to simultaneously supply the sensible heat and the endothermic heat of reaction. In a thermochemical plant, a modular array of catalytic cartridges and heat pipes could be utilized.

Changes and modifications in the specifically described embodiments can be carried out without departing from the scope of the invention, which is intended to be limited only by the scope of the appended claims.

I claim:

1. A cross-flow SO$_3$ decomposer for thermochemical hydrogen production, comprising:
    a cartridge comprising a plurality of walls defining a chamber therebetween, and a cylindrical tube mounted in the chamber and extending through the chamber from one wall of the chamber to an opposing wall thereof, the outer surface of the cylindrical tube being coated with a catalyst for promoting SO$_3$ decomposition reactions;
    a heat pipe extending into the cylindrical tube and in thermal proximity therewith, the heat pipe adapted to be driven by a heat source for transferring heat to the catalyst for heating the catalyst; and
    an inlet port and an outlet port in opposing walls of the cartridge, the inlet port and outlet port being provided at opposite sides of the tube substantially perpendicular to the longitudinal axis of the tube, whereby SO$_3$ gas may be flowed through the inlet port in a direction substantially normal to the tube across the catalyst to contact the catalyst and thereby produce SO$_3$ decomposition into SO$_2$ and O$_2$ which are removable through the outlet port.

2. An axial-flow SO$_3$ decomposer for thermochemical hydrogen production, comprising:
    a cartridge comprising a pair of concentric cylindrical tubes and a pair of end walls, the tubes being mounted at each end to an end wall, the concentric tubes and end walls defining an annular space therebetween, the outer surface of the inner concentric tube being coated with a catalyst for promoting SO$_3$ decomposition reactions;
    a heat pipe extending into the inner concentric cylindrical tube and in thermal proximity therewith, the heat pipe adapted to be driven by a heat source for transferring heat to the catalyst for heating the catalyst; and
    an inlet port and outlet port at opposing ends of the outer concentric tube whereby SO$_3$ gas may be flowed through the inlet port and through the annular space between the tubes in an axial direction with respect to the tubes to contact the catalyst and thereby produce SO$_3$ decomposition into SO$_2$ and O$_2$ which are removed through the outlet port.

3. The decomposer of claims 1 or 2 wherein the catalyst is platinum.

4. The decomposer of claims 1 or 2 wherein the catalyst is CuO.

5. The decomposer of claims 1 or 2 wherein the catalyst is Fe$_2$O$_3$.

6. The decomposer of claims 1 or 2 wherein the heat pipe is a tritium-concentrating heat pipe driven by a fusion reactor.

7. The decomposer of claim 7 wherein the cylindrical tube into which the heat pipe extends is separated from the heat pipe by a narrow annular space therebetween, and further including means for flowing helium gas through the narrow annular space to sweep out permeated tritium.